United States Patent

Linville

[15] 3,648,793
[45] Mar. 14, 1972

[54] LOAD MEASURING SYSTEM
[72] Inventor: Richard D. Linville, Pleasant Valley, Iowa
[73] Assignee: National Manufacturing Company, Sterling, Ill.
[22] Filed: Feb. 9, 1971
[21] Appl. No.: 113,950

[52] U.S. Cl. .............................................. 177/210, 73/141
[51] Int. Cl. ......................................... G01g 3/15, G01g 7/02
[58] Field of Search ..................... 177/210, 211, 1; 73/141 A

[56] References Cited

UNITED STATES PATENTS

| | | | |
|---|---|---|---|
| 2,081,367 | 5/1937 | Nicolson | 177/210 |
| 2,407,513 | 9/1946 | Pounds | 177/210 X |
| 2,914,310 | 11/1959 | Bahrs | 177/210 |
| 3,058,076 | 10/1962 | Hasler et al. | 177/210 X |
| 3,186,504 | 6/1965 | Van Wilgen | 177/210 |
| 3,209,846 | 10/1965 | Karlen | 177/210 |
| 3,295,368 | 1/1967 | Nevius | 177/211 X |
| 3,464,508 | 9/1969 | Engle et al. | 177/211 X |

FOREIGN PATENTS OR APPLICATIONS

| | | | |
|---|---|---|---|
| 871,795 | 6/1961 | Great Britain | 177/210 |
| 324,337 | 10/1957 | Switzerland | 177/211 |

Primary Examiner—Robert S. Ward, Jr.
Attorney—Fidler, Patnaude & Lazo

[57] ABSTRACT

A load cell includes a magnetic circuit producing a constant magnetic field and a coil which is adapted to be suspended in such field and to which the mechanical force to be measured is applied. The coil is mechanically connected to the core of a linear voltage differential transformer and is energized with a pulsating direct current having an amplitude controlled by the displacement of the transformer core from a null or balanced position. The amplitude of the coil energizing current reacts with the magnetic field to precisely counterbalance the mechanical force applied to the coil and is proportional to that force. A digital ammeter is used to measure the DC value of the energizing current and thus to provide a readout of the force being measured.

8 Claims, 2 Drawing Figures

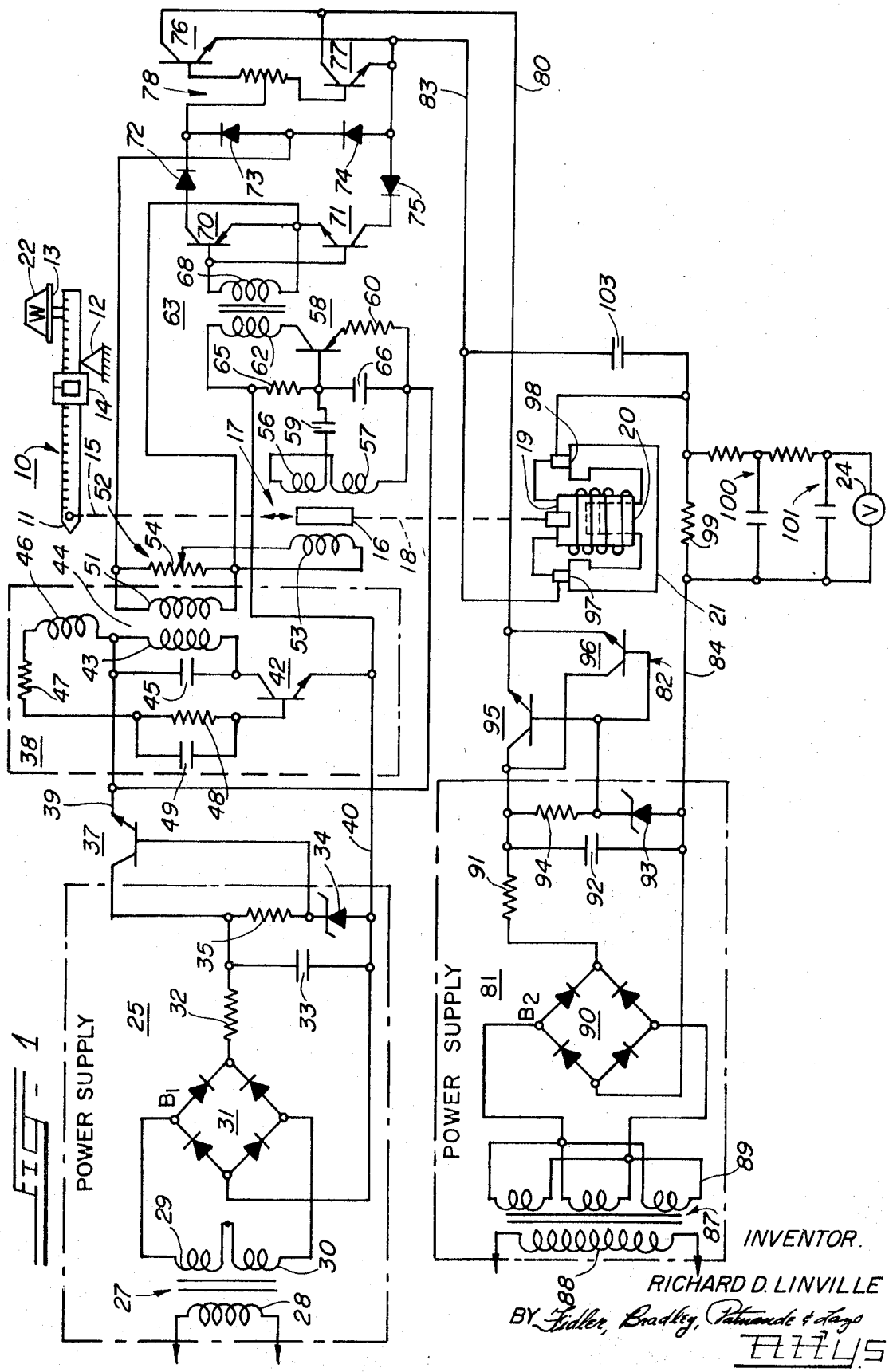

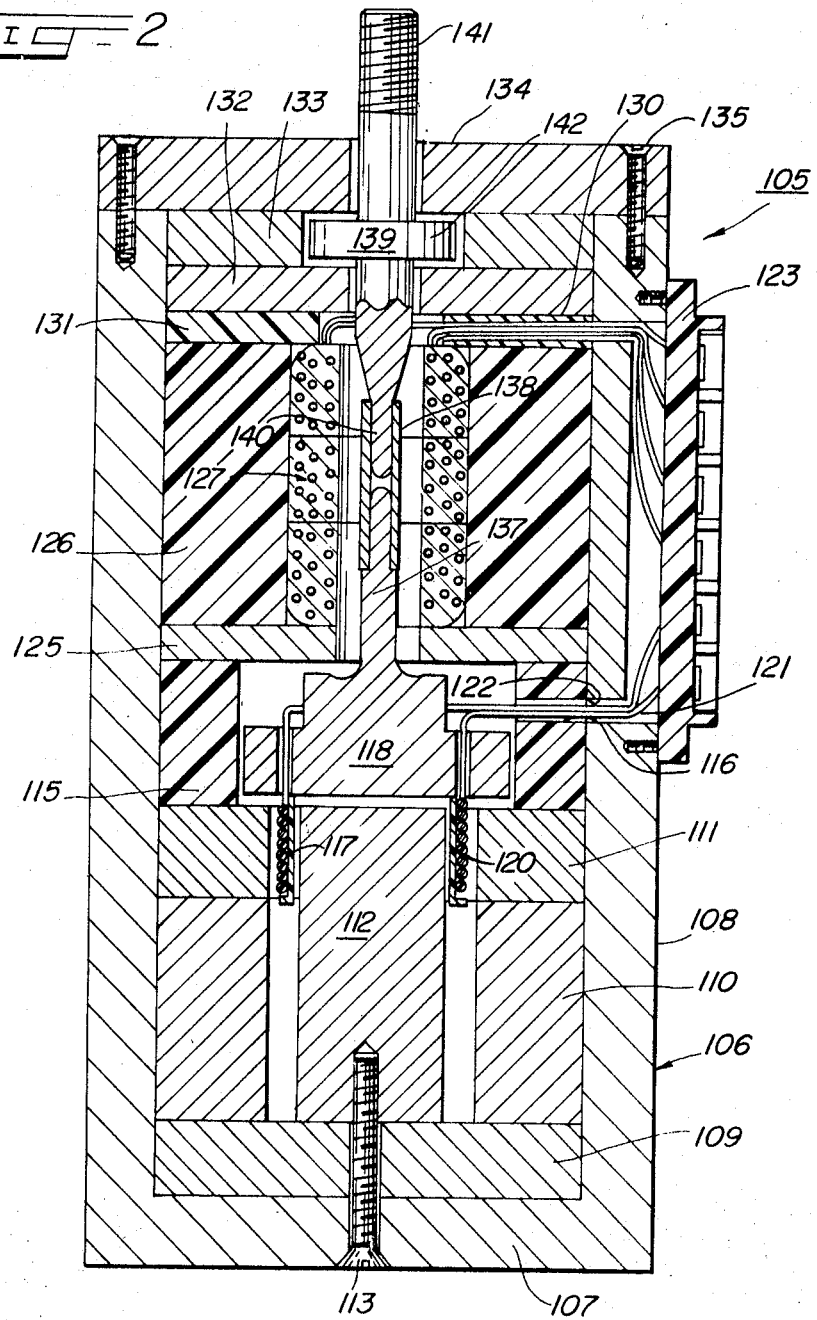

LOAD MEASURING SYSTEM

The present invention broadly relates to a force balancing system using electromagnetic means for generating a mechanical force equal to an applied mechanical force, and it relates more particularly to a force measuring or weighing system providing a fast and precise readout.

Weighing devices such as load cells which employ an electromechanical device to restore equilibrium to the balance mechanism of a scale are known in the prior art, and it is also known to measure the current required to produce the counterbalancing force thereby to provide, in accordance with Maxwell's Law, a readout which is proportional to the force being measured. U.S. Pat. No. 2,914,310 to Bahrs discloses such a weighing system. In spite of the apparent simplicity of such systems, however, they had not been widely used or accepted beyond the laboratory. One reason for this lack of acceptance may be the susceptibility of such systems to even minor external vibrations. Another reason may be the loss of measurement accuracy which has accompanied attempts to dampen out the effects of such vibrations by both electrical and mechanical means.

A principal object of the present invention is, therefore, to provide a new and improved system and method for producing by electromagnetic means a force for counterbalancing an applied mechanical force.

Another object of this invention is to provide such a system which is substantially insensitive to external, mechanical vibrations.

A further object of this invention is to provide a new and improved electric circuit for providing an output proportional to the movement of a mechanical element connected to an element of said circuit.

A still further object of this invention is to provide a new and improved load cell.

Briefly, the above and further objects of the present invention may be realized by mechanically interconnecting the core of a linear voltage differential transformer to a coil positioned in a permanent magnetic field and applying the force to be measured to this core and coil assembly. The transformer is energized from an audio voltage source and the phase of the transformer output signal is compared in a phase detector with that from the source to provide an output signal having an amplitude proportional to the deflection of the core of the differential transformer. This audio signal is superimposed on a regulated direct current and supplied to the coil to exert on the core and coil assembly a force equal to the applied force to be measured. An ammeter in the form of a series connected resistor or shunt and a digital voltmeter is used to provide a visual readout of the average DC value of the coil current and thus a readout which is proportional to the applied force to be measured.

The invention, both as to its organization and method of operation, together with further objects and advantages thereof will best be understood by reference to the following detailed description taken in connection with the accompanying drawings, wherein:

FIG. 1 is a schematic circuit diagram of a weighing system embodying the present invention; and FIG. 2 is a cross-sectional view of a sensing and counterbalancing mechanism embodying other features of the present invention.

Referring now to the drawing and more particularly to FIG. 1 thereof, a weighing scale 10 includes a scale beam 11 pivotally supported on a fulcrum 12 and having a load carrying platform 13 at one end of the fulcrum and a slidable weight 14 at the other. The slidable weight 14 is disposed at the zero position when the electric circuit of FIG. 1 is being used. A mechanical connection in the form of a cable 15 is connected between the left-hand end of the beam 11 and the movable core 16 of a linear voltage differential transformer 17. The transformer core 16 is connected by a suitable mechanical connection 18 to a cylindrical coil form 19 on which a coil 20 is wound. The coil form 19 and the coil 20 are very light and the coil 20 may be, for example, the coil from a permanent magnet type loudspeaker. The coil form 19 and the coil 20 which is wound thereon are vertically movable as a unit in the magnetic field of a permanent magnetic circuit 21 whereby the passage of current through the coil 20 results in an axial mechanical force being exerted on the coil 20 and on the coil form 19 on which it is wound. As described in detail hereinafter, the current through the coil 20 is controlled by the electric circuit of FIG. 1 to exert a force on the cable 15 equal to and opposite to the force exerted thereon by a weight 22 positioned on the scale platform 13. A digital voltmeter 24 is connected in circuit with the coil 20 to provide a visual readout proportional to the weight supported on the scale platform 13.

Considering now the electric circuit of FIG. 1, a DC power supply 25 comprises a power transformer 27 having a primary winding 28 adapted to be connected to a suitable source of 115 volts AC and a pair of secondary windings 29 and 30 connected together in series across a full-wave rectifier bridge 31 to the output terminals of which an RC filter including a resistor 32 and a capacitor 33 are connected in series. The filtered DC output is taken from across the capacitor 33 and regulated by means of a Zener diode 34 connected in series with a resistor 35 across the capacitor 33. The base of an NPN-transistor 37 is connected to the junction between the Zener diode 34 and the resistor 35 and the other side of the resistor 35 is connected to the collector of the transistor 37. As shown, the output current from the emitter of the transistor 37 is used to drive an audio oscillator 38. Preferably, the oscillator operates at a frequency in the order of 2,000 Hertz although the system functions satisfactorily from frequencies of a few hundred to 20,000 Hertz. The oscillator 38 comprises an NPN-transistor 42 having its emitter connected to the conductor 40 and its collector connected through the primary winding 43 of an audio transformer 44 to the conductor 39. A capacitor 45 is connected in parallel with the transformer winding 43 to provide a tuned collector circuit, and the conductor 39 is connected to the base of the transistor 42 by a feedback winding 46 on the transformer 44, a resistor 47 and the parallel circuit comprising a resistor 48 and a capacitor 49. The output of the oscillator 38 which is an audio frequency sine wave appears across the output winding 51 of the transformer 44 and across a potentiometer 52 connected across the winding 51. A portion of the audio signal on the potentiometer 52 is tapped off and supplied to the primary winding 53 of the differential transformer 17. More particularly, the winding 53 is connected in series between the wiper 54 and the lower terminal of the potentiometer 52.

In addition to the primary or input winding 53 the linear voltage differential transformer 17 is provided with two output windings 56 and 57. These windings 56 and 57 are connected together in phase opposition or bucking relationship and the signal developed thereacross is amplified in an amplifier circuit including a transistor 58. Considered more particularly, the lower end of the winding 56 is connected through a capacitor 59 to the base of the transistor 58, and the lower end of the winding 57 is connected to the emitter of the transistor 58 by means of a resistor 60. The negative power supply bus 40 is connected to the collector of the transistor 58 by the primary winding 62 of an output transformer 63 and to the base of the transistor 58 by means of a resistor 65. A capacitor 66 is connected between the base of the transistor 58 and the junction between the transformer winding 57 and the emitter resistor 60. The amplified output from the differential transformer 17 which is an audio signal having an amplitude and phase related to the position of the core 16 relative to the output windings 56 and 57 is coupled from the primary winding 62 of the transformer 63 to the secondary winding 68 across which a pair of transistors 70 and 71 are connected. The transistor 70 is a PNP-transistor while the transistor 71 is of the NPN-type. The emitters and bases of the transformers 70 and 71 are connected together and to opposite ends of the transformer winding 68. A plurality of rectifiers 72, 73, 74, and 75 are connected in series between the collectors of the transistors 70 and 71 and the audio output signal from the oscillator 38, which appears across the potentiometer 52, is connected directly between the junctions of the emitters of the transistors 70 and 71 and the junction of the rectifiers 73 and 74. A signal proportional to the phase difference between the frequency developed across the windings 68 and 51 is thus developed across the rectifiers 73 and 74 and amplified by a pair of NPN-output transistors 76 and 77 connected in parallel. More particularly, the emitters of the transistors 76 and 77 are connected together and to the junction of the rectifiers 74 and 75 and the bases of the transistors 76 and 77 are connected through a balancing potentiometer 78 to the junction between the rectifiers 72 and 73. The collectors of the transistors 76 and 77 are also connected together and to a conductor 80 which is provided with regulated DC current from a power supply 81 and an amplifier 82. The emitter electrodes of the power transistors 76 and 77 are connected by means of a conductor 83 in series with the force balancing coil 20 and the voltmeter 24 to the negative output conductor 84 from the power supply 81 and the amplifier 82.

The power supply 81 is of essentially the same construction as the power supply 25 and thus includes a power transformer 87 having a primary winding 88 adapted to be energized from a suitable source of 115 volts AC and a plurality of secondary windings 89 connected in series aiding relationship across the input terminals of a full-wave rectifier bridge 90 across the output terminals of which an RC filter comprising a resistor 91 and a capacitor 92 is connected. The filtered output current is taken from across the capacitor 92 and is regulated by means of a Zener diode 93 connected in series with a resistor 94 across the capacitor 92. A pair of NPN-transistors 95 and 96 are connected in parallel to provide an amplified DC output between the conductors 80 and 84.

In order to provide substantially frictionless electrical connections to the movable coil 20, a pair of mercury pots 97 and 98 are provided. The conductor 81 is connected to the conductive container portion of the mercury pot 97. The conductive container of the other mercury pot 98 is connected to one terminal of a shunt resistor 99, the other terminal of which is connected to the negative power supply conductor 84. The two ends of the coil 20 have exposed leads which depend into the mercury contained in the pots 97 and 98, thereby to provide continuous electrical connections from the two terminals of the coil 20 to the remainder of the circuit as the coil 20 moves up and down under the influence of the weight on the load platform 13.

A pair of RC filters 100 and 101 are provided to couple the shunt resistor 99 to the voltmeter 24 which has a digital readout to facilitate the accurate reading of the current in the coil 20. A small filtering capacitor 103 is connected across the coil 20 to bypass a portion of the audio frequency signal. It has been found that too large a capacitor 103 is used, thereby to substantially eliminate the audio frequency component from the coil energization current, the system becomes unstable and is not only slow to reach a quiescent state wherein reading is possible but is extremely sensitive to even minor vibrations caused, for example, by persons walking in the vicinity on a concrete floor.

OPERATION

In the absence of a weight on the platform 13, it is assumed that the beam 11 is balanced at a null position whereby the core 16 of the transformer 17 is located such that the output windings 56 and 57 develop equal and opposite voltages and no signal is developed across the output winding 68 of the transformer 63. The transistors 70 and 71 thus remain cut off and no output is developed between the conduits 80 and 83 and no current flows through the coil 20. When a load such as the load 22 is placed on the scale platform 13, the left-hand end of the beam 11 starts to move upwardly. A displacement of less than 0.001 inch causes an unbalance of the audio voltages developed across the windings 56 and 57 and this signal is coupled through the capacitor 59 to the base of the transistor 58 to permit current flow between the collector and the emitter thereof. This current is amplified in the transistor 58 and developed in the secondary winding 68 of the transformer 63 from which it is applied between the base and emitter electrodes of the transistors 70 and 71. These transistors are part of a full-wave discriminator which produces an output signal across the series connection of the rectifiers 73 and 74. Inasmuch as the transformer 17 is energized from across a portion of the potentiometer 52, the signal which is impressed between the emitters of the transistors 70 and 71 and the junction between the rectifiers 73 and 74 is at the same frequency as the signal developed across the transformer winding 68. If these signals are in phase, there is no output developed. On the other hand, if they are out of phase such that when the bases of the transistors 70 and 71 go positive the emitters go negative, the NPN-transistor 71 will conduct, and during the following half cycle when the base electrodes go negative and the emitter electrodes go positive the PNP-transistor 70 will conduct. First tracing the conductive circuit for the transistor 71, when the transistor 71 is rendered conductive, electron flow is from the emitter to the conductor, through the rectifier 75, through the emitters to the bases of transistors 76 and 77, through the potentiometer 78 and through the rectifier 73 to the other terminal of the transformer winding 51. During the next half cycle when the transistor 70 is rendered conductive and the transistor 71 is cut off, electron flow is through the rectifier 74, through the emitter to collector circuits of the transistors 76 and 77, through the potentiometer 78, through the rectifier 72, and from the collector to the emitter of the transistor 70 to the opposite terminal of the transformer winding 51. The transistors 76 and 77 thus conduct on successive half cycles of the oscillator signal.

It may thus be seen that the output from the transistors 76 and 77 is a pulsating output which is smoothed to some extent by the capacitor 103. This current flowing through the coil 20 produces a force in a direction to return the core 16 of the linear voltage differential transformer to its zero position. However, the core 16 is not returned to the zero position but remains in that position wherein the necessary current is produced in the coil 20 to counterbalance the weight resting on the load platform 23. In using the load cell of the present invention it has been found desirable to preload the system so that when zero load is placed on the load platform 13 the core 16 is displaced from its null position.

As thus far described, the load cell and associated circuitry of the present invention may be used to convert a mechanical beam balance scale to an electronic digital readout scale. If desired, a printed record of the readout can be provided by connecting a readout device in parallel with the voltmeter 24. When the load cell and the circuit of the present invention are used in connection with a beam scale, its accuracy relative to the beam scale can readily be checked by simply deenergizing the circuit and using the weight 14 to balance the weight contained on the scale platform 13. By comparing the reading thus obtained with that appearing on the voltmeter 24 during normal operation, operation of the circuit may be readily corroborated.

While the load cell and circuit of the present invention are illustrated as being connected by means of a cable to one end of the balance beam 11 of scale 10, it will be readily appreciated by those skilled in the art that the device can be mechanically connected to the opposite side of the balance such that the force applied tends to move the core 16 of the linear voltage differential transformer 17 in a downward rather than an upward direction. Moreover, if desired, a leverage system may be incorporated directly into the load cell device.

Referring now to FIG. 2, there is shown a load cell 105 embodying certain features of the present invention and usable in the system illustrated in FIG. 1. The load cell 105 comprises a cup-shaped, nonconductive, nonmagnetic, housing member 106 having a circular bottom wall 107, and an upstanding cylindrical wall 108. A disc 109 formed of magnetic material and having an external diameter slightly less than the internal diameter of the portion 108 of the housing is positioned in the bottom of the housing and an annularly shaped permanent magnet 110 polarized in a vertical direction is fitted in the housing directly against the disc 109. A washer 111 also formed of magnetic material is fitted over the top of the magnet 110 and a cylindrical magnetic core 112 is centrally disposed within the magnet 110 and secured to the disc 109 by means of a screw 113 which extends through aligned openings in the bottom 107 of the housing and the disc 109 and threadedly engages the core 112. A radial magnetic field is thus established in the gap between the upper portion of the core 112 and the inner wall of the washer or pole piece 111.

A nonmagnetic annular spacer 115 is positioned directly on top of the washer 111 and is provided with a transverse hole 116 therein. A cylindrical nonmagnetic coil form 117 depends from a core member 118 and is positioned in the gap between the core 112 and the washer 111. A coil 120 is wound on the coil form 117 and a plurality of leads 121 thereof extend through the hole 116 and through an aligned hole 122 in the wall of the housing 106 to a terminal board 123 mounted on the outer surface of the housing 106.

A nonmagnetic washer 125 is positioned on the spacer 115 and an annular spacer 126 formed of nonmagnetic material is positioned over the washer 125. The windings 127 of a linear voltage differential transformer are mounted within a central hole in the spacer 126 on the washer 125 and the leads therefrom extend through a transverse opening 130 in an annular spacer 131 and an aligned opening in the housing 106 for connection to other terminals of the terminal board 123. An annular spacer 132 and another annular spacer 133 are stacked above the spacer 131 and are held in place by an annular cover 134 which is secured to the housing by means of a plurality of screws 135.

The nonmagnetic member 118 has a centrally disposed upstanding spindle portion 137 on the upper end of which is mounted a tubular magnetic armature 138 of the linear voltage differential transformer. A connecting rod 139 has a depending spindlelike portion 140 which is fixedly connected in the upper end of the armature tube 138, and the rod 139 also has a threaded outer end 141 for coupling the load cell to a force supplying mechanism. A centrally disposed annular flange 142 having a thickness substantially less than that of the adjacent spacer washer 133 is provided to prevent excessive axial movement of the rod 139 when the load cell is deenergized. During normal operation of the load cell, the maximum axial movement of the rod is a few thousandths, which is substantially less than the clearance provided between the top and bottom sides of the flange 142 and the washer 132 and the end cover 134.

The load cell is illustrated in FIG. 2 in its normally energized position wherein the top and bottom surfaces of the flange 142 are spaced from the cover 134 and the washer 132. It will be noted that the load cell 105 may be operated in either compression or tension depending upon the way in which the windings of the transformer 127 and of the coil 120 are connected in the associated circuit.

While the present invention has been described in connection with a particular embodiment thereof, it will be understood that many changes and modifications may be made without departing from the true spirit and the scope of the present invention. It is intended, therefore, to cover all such changes and modifications in the appended claims.

What is claimed is:

1. A force measuring system, comprising
    means for producing an electric signal having an amplitude proportional to the movement of a part thereof,
    means for coupling said force to said part,
    a magnetic circuit having an air gap therein,
    a coil movably mounted in said air gap,
    means responsive to said signal for supplying to said coil a unidirectional current having a substantial audio frequency component and an amplitude proportional to the movement of said part,
    means mechanically connecting said coil to said part whereby the electromagnetic force exerted on said coil is mechanically coupled to said part to counterbalance the force to be measured, and
    means for measuring and indicating the current in said coil.

2. A force measuring system according to claim 1 wherein
    said means for producing an electric signal includes a linear voltage differential transformer including a movable core, and
    said part is said core.

3. A force measuring system according to claim 2 wherein
    said means for producing an electric signal further includes an audio frequency oscillator having an audio frequency output connected to said transformer.

4. A force measuring system according to claim 3 wherein
    said means for producing an electric signal further includes a phase detector having first and second inputs,
    means for supplying one of said inputs with an output signal from said oscillator, and
    means for supplying the other of said inputs with an output signal from said transformer.

5. A force measuring system according to claim 1 wherein
    said means for measuring and indicating comprises
    a digital DC voltmeter.

6. A force measuring system according to claim 5 wherein
    an AC bypass filter is connected between said voltmeter and said coil to inhibit the measurement of said audio component by said voltmeter.

7. An electronic weighing device according to claim 1 and further comprising
    a scale beam,
    a fulcrum pivotally supporting said beam,
    means mechanically connecting said part to a location on said beam remote from said fulcrum, and
    means for supporting a weight to be measured on said beam at a location remote from said fulcrum and remote from the location where said part is connected thereto.

8. A load cell adapted to be used in the system of claim 1, comprising
    a nonmagnetic generally cylindrical housing,
    a disc formed of magnetic material positioned in said housing,
    an annular permanent magnet disposed in said housing with one annular pole face in abutting relationship with said disc,
    a solid cylindrical, magnetic member disposed within and in spaced relationship with said magnet and secured to said disc,
    an annular pole piece disposed in abutment with the other annular pole of said magnet,
    a cylindrical coil form disposed in the annular space between said magnet and said solid cylindrical member,
    a coil wound on said form,
    a linear voltage differential transformer mounted in said housing and including a movable core and a plurality of windings,
    means securing said core to said coil form to prevent relative movement between said core and said coil form, and
    means fixedly mounting said windings in said housing.

* * * * *